United States Patent
Kogane

(10) Patent No.: US 10,124,607 B2
(45) Date of Patent: Nov. 13, 2018

(54) PRINTING APPARATUS INCLUDING A GUIDING MECHANISM THAT REPRESENTS A POSITION OF A PRINT AREA

(71) Applicant: CASIO COMPUTER CO., LTD., Shibuya-ku, Tokyo (JP)

(72) Inventor: Takayuki Kogane, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/675,198

(22) Filed: Aug. 11, 2017

(65) Prior Publication Data
US 2018/0086106 A1 Mar. 29, 2018

(30) Foreign Application Priority Data

Sep. 28, 2016 (JP) .................. 2016-189161

(51) Int. Cl.
| | |
|---|---|
| *B41J 3/46* | (2006.01) |
| *B41J 3/36* | (2006.01) |
| *H04N 1/047* | (2006.01) |
| *H04N 1/107* | (2006.01) |
| *H04N 1/04* | (2006.01) |
| *H04N 1/032* | (2006.01) |

(52) U.S. Cl.
CPC . *B41J 3/46* (2013.01); *B41J 3/36* (2013.01); *H04N 1/032* (2013.01); *H04N 1/047* (2013.01); *H04N 1/0461* (2013.01); *H04N 1/107* (2013.01); *H04N 1/1077* (2013.01); *H04N 2201/0082* (2013.01); *H04N 2201/0414* (2013.01); *H04N 2201/0471* (2013.01); *H04N 2201/04737* (2013.01); *H04N 2201/04789* (2013.01); *H04N 2201/04791* (2013.01)

(58) Field of Classification Search
None
See application file for complete search history.

(56) References Cited

U.S. PATENT DOCUMENTS

| | | | | |
|---|---|---|---|---|
| 5,634,730 | A * | 6/1997 | Bobry ........................ | B41J 3/36 346/143 |
| 5,825,995 | A * | 10/1998 | Wiklof ................. | B41J 2/16511 358/1.18 |
| 5,927,872 | A * | 7/1999 | Yamada ..................... | B41J 2/36 400/88 |

(Continued)

FOREIGN PATENT DOCUMENTS

JP      2008094101 A      4/2008

*Primary Examiner* — Miya J Williams
(74) *Attorney, Agent, or Firm* — Holtz, Holtz & Volek PC

(57) ABSTRACT

A printing apparatus comprises: a printer that includes a printing mechanism that performs printing on a printing medium, the printing mechanism being provided in a print area; a housing that includes an opening region for exposing the printing mechanism to outside; and a guiding mechanism that represents a position of the print area. The guiding mechanism is provided at a position directly above the print area and visible from outside. Accordingly, when a user performs printing on the printing medium using this printing apparatus, the user can easily grasp a position of the print area by means of the guiding mechanism, and therefore can print on a desired position on the printing medium.

16 Claims, 11 Drawing Sheets

(56) References Cited

U.S. PATENT DOCUMENTS

| | | | | |
|---|---|---|---|---|
| 6,229,565 | B1* | 5/2001 | Bobry | H04N 1/00278 348/207.99 |
| 6,357,939 | B1* | 3/2002 | Baron | B41J 3/36 400/61 |
| 7,524,051 | B2* | 4/2009 | Ahne | B41J 3/36 347/108 |
| 7,876,472 | B2 | 1/2011 | Gudan et al. | |
| 2003/0081270 | A1* | 5/2003 | Hoshino | H04N 1/107 358/474 |
| 2003/0202083 | A1* | 10/2003 | Deguchi | B41J 3/36 347/108 |
| 2005/0018033 | A1* | 1/2005 | Walling | B41J 3/36 347/109 |
| 2008/0212120 | A1* | 9/2008 | Mealy | H04N 1/032 358/1.12 |
| 2009/0040286 | A1* | 2/2009 | Tan | B41J 3/36 347/109 |

* cited by examiner

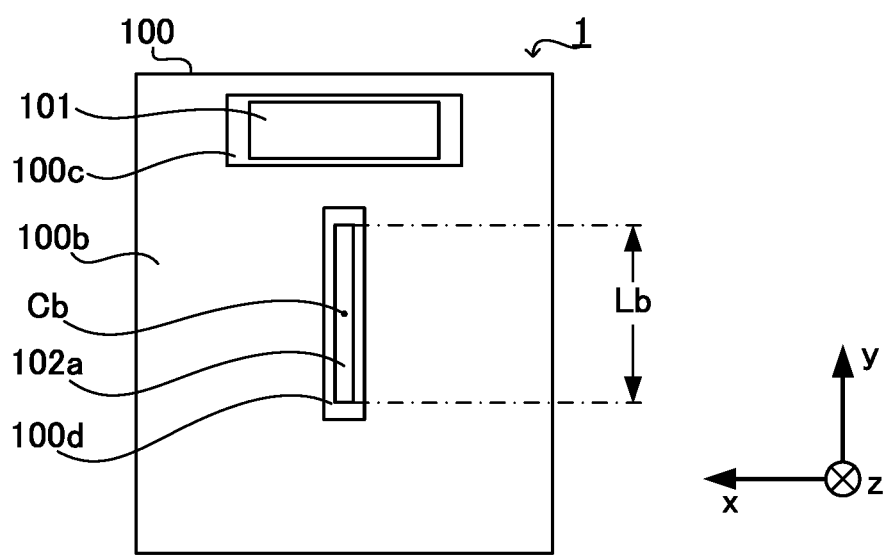

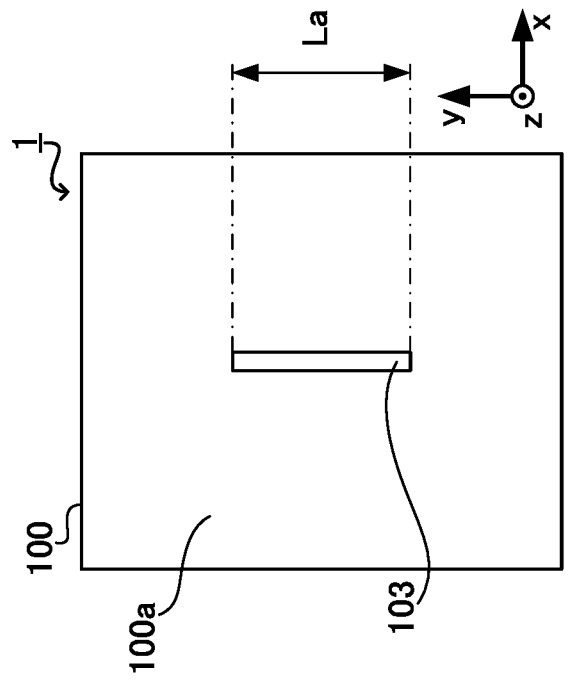
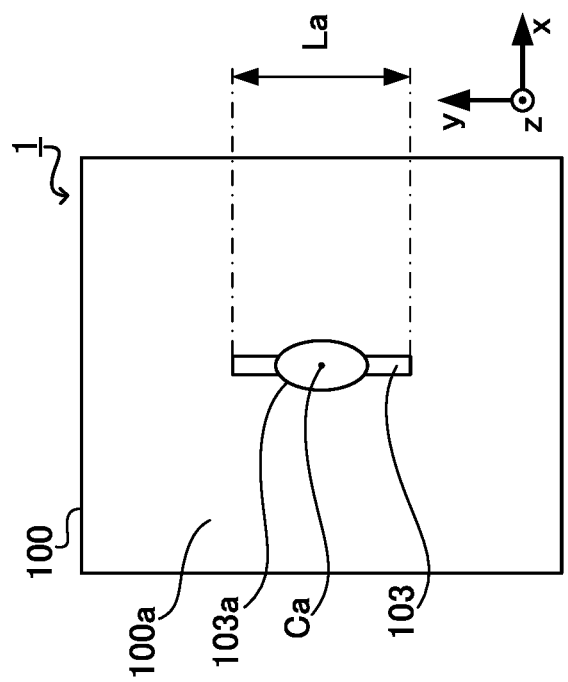

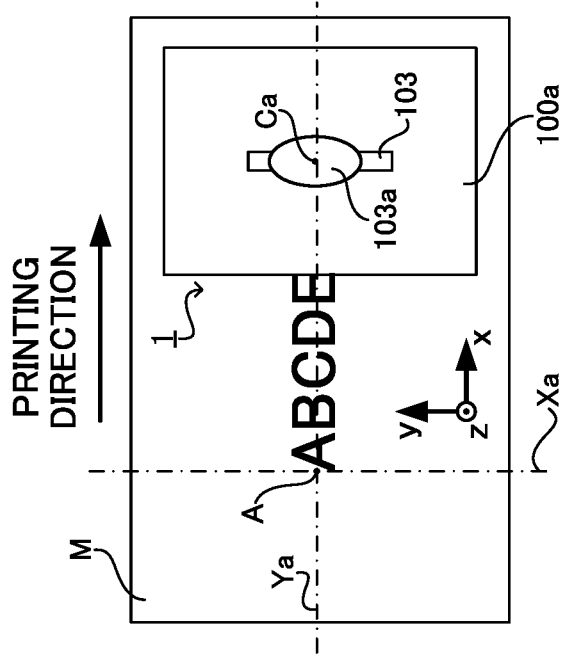
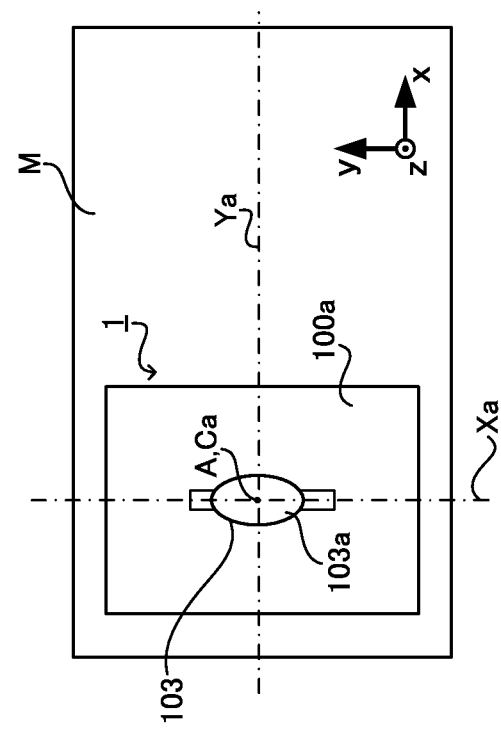

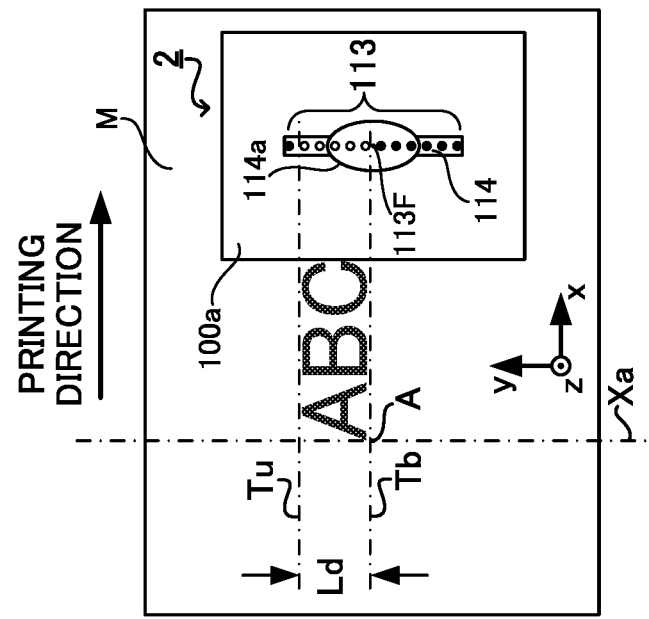
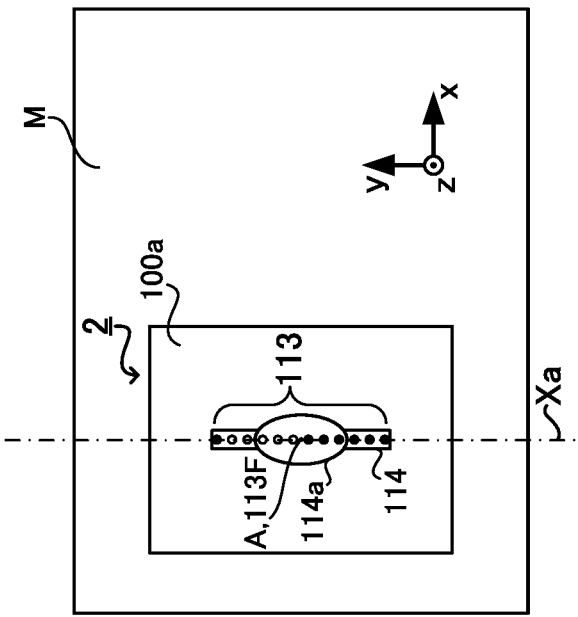

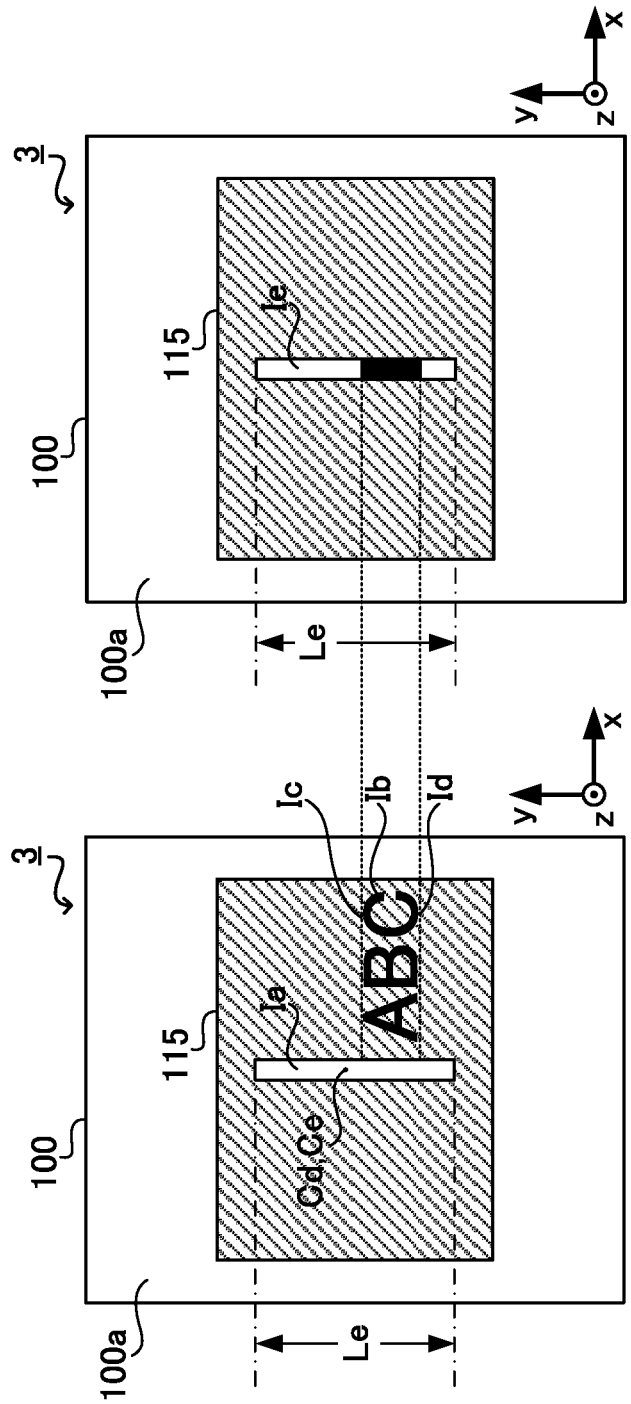

PRINTING APPARATUS INCLUDING A GUIDING MECHANISM THAT REPRESENTS A POSITION OF A PRINT AREA

CROSS-REFERENCE TO RELATED APPLICATION

This application claims the benefit of Japanese Patent Application No. 2016-189161, filed on Sep. 28, 2016, the entire disclosure of which is incorporated by reference herein.

FIELD

This application relates to a printing apparatus.

BACKGROUND

Printing apparatuses which print an image to be printed on a printing medium as the printing apparatuses move on the printing medium are known.

For example, Unexamined Japanese Patent Application Kokai Publication No. 2008-094101 discloses a handheld printer that prints an image on a printing medium as a user moves the handheld printer on the printing medium.

When printing is performed using the handheld printer described in the above-mentioned literature, after placing the handheld printer on the printing medium so that a print head that performs the printing is placed on a desired position on the printing medium, a user causes the handheld printer to start the printing and then causes the handheld printer to perform printing on the printing medium by manually moving the handheld printer on the printing medium.

In the handheld printer as described in the above-mentioned literature, the print head is provided on a surface of a portable housing that is a main body, which faces the printing medium.

Therefore, in a state in which such a handheld printer is placed on the printing medium, the print head is hidden by the portable housing, which makes it difficult for a user to grasp the accurate position of the print head.

That is, such a handheld printer has a structure which makes it difficult for a user to grasp the position of the print head on the printing medium.

Accordingly, when such a handheld printer is used in printing, it has been difficult to perform printing while setting the desired position on the printing medium as a start position of the printing.

SUMMARY

According to the present disclosure, in a printing apparatus that performs printing on a printing medium by moving on the printing medium, it becomes able to intuitively set the start position of printing by an easy operation.

So as to obtain the above-described advantage, a printing apparatus according to the present disclosure comprises:

a printer that includes a printing mechanism that performs printing on a printing medium, the printing mechanism being provided in a print area;

a housing that includes an opening region for exposing the printing mechanism to outside; and a guiding mechanism that represents a position of the print area, wherein the guiding mechanism is provided at a position directly above the print area and visible from outside.

BRIEF DESCRIPTION OF THE DRAWINGS

A more complete understanding of this application can be obtained when the following detailed description is considered in conjunction with the following drawings, in which:

FIG. 2 is a bottom view of the printing apparatus according to Embodiment 1 of the present disclosure;

FIG. 3A is an example of a top view of the printing apparatus according to Embodiment 1 of the present disclosure;

FIG. 3B is another example of a top view of the printing apparatus according to Embodiment 1 of the present disclosure;

FIG. 4A and FIG. 4B are each a top view to show a function played by a printing start button in the printing using the printing apparatus according to Embodiment 1 of the present disclosure, where FIG. 4A is a top view illustrating a setting of a start position of printing, and FIG. 4B is a top view illustrating a printing operation;

FIG. 5A is a perspective view illustrating a setting of the start position of printing, and FIG. 5B is a perspective view illustrating the printing operation;

FIG. 8A is an example of a top view of the printing apparatus according to Embodiment 2 of the present disclosure, and FIG. 8B is another example of a top view of the printing apparatus according to Embodiment 2 of the present disclosure;

FIG. 10A and FIG. 10B are each a top view to show a function played by a printing start button in the printing using the printing apparatus according to Embodiment 2 of the present disclosure, where FIG. 10A is a top view illustrating a setting of a start position of printing, and FIG. 10B is a top view illustrating a printing operation;

FIG. 11A is an example of a top view of a printing apparatus according to Embodiment 3 of the present disclosure, and FIG. 11B is another example of a top view of the printing apparatus according to Embodiment 3 of the present disclosure; FIG. 12A is a top view illustrating a setting of a start position of printing, and FIG. 12B is a top view illustrating a printing operation.

DETAILED DESCRIPTION

Figure 1:
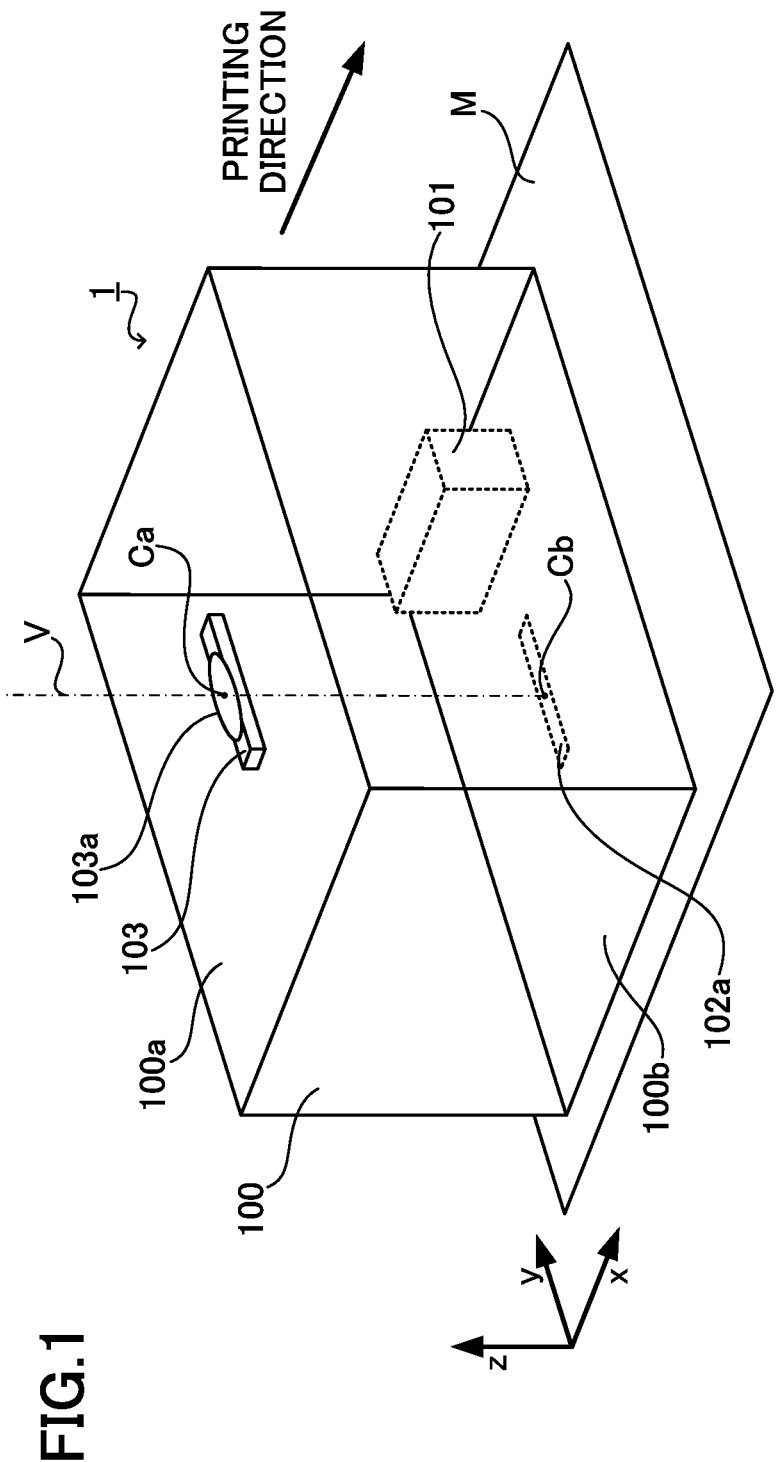
FIG. 1 is a diagram illustrating an external view of a printing apparatus according to Embodiment 1 of the present disclosure.

The following details the functions and operations of printing apparatuses according to embodiments of the present disclosure, with reference to the drawings.

Embodiment 1

Hereinafter, a printing apparatus according to Embodiment 1 of the present disclosure is described with reference to the drawings. In the drawings, the same or equivalent components are assigned the same reference numeral.

The printing apparatus 1 illustrated in FIG. 1 is a manual scanning printing apparatus that can be held and moved on a printing medium M by a user, and can print an image to be printed on the printing medium M as the printing apparatus 1 moves.

Manual scanning printing apparatuses are occasionally referred to as handy printers, handheld printers, or handheld portable printers, and the like.

An image to be printed is an image to be printed on the printing medium M in printing.

An image to be printed is occasionally referred to as a printed image or a printing pattern, and the like.

Some concrete examples of an image to be printed are characters, pictorial figures, marks, patterns, graphics, and a combination of them.

The printing medium M is an object on which an image to be printed is printed during printing.

The printing medium M is occasionally referred to as a printed medium, a recording medium, or a printing target, and the like.

Some concrete examples of the printing medium M are paper, fabric, synthetic resin, cardboard, boxes, and bottles.

The printing apparatus 1, which is a manual scanning printing apparatus, can print on more varieties of printing media 200 than stationary printing apparatuses that print while conveying the printing medium M.

In other words, the printing apparatus 1 can not only print on a printing medium M such as paper that is easily conveyed, just as stationary printing apparatuses, but also print on a printing medium M, which has a material or a form not easily conveyed and thus cannot be printed easily with stationary printing apparatuses, such as fabric, synthetic resin, cardboard, boxes, and bottles.

A direction in which a user moves the printing apparatus 1 in printing is referred to as a printing direction. The printing direction is also occasionally referred to as a sub scanning direction, a moving direction, and the like.

Note that so as to facilitate understanding, the x, y, z-coordinate axes are set as illustrated in FIG. 1. The x-axis and the y-axis are directions in which a lower surface 100b of a housing 100 described later extends; where the x-axis is a direction orthogonal to a lengthwise direction in which a print area 102a described later extends, the y-axis is a direction along the lengthwise direction of the print area 102a, and the z-axis is a direction orthogonal to the lower surface 100b.

Hereinafter, an example is described in which a user moves the printing apparatus 1, with the x-axis direction as the printing direction. In this example, the y-axis direction is referred to as back, and the z-axis direction is referred to as above.

The printing apparatus 1, as illustrated in FIG. 1, comprises a housing 100 to be held by a user, a moving amount detector 101 that detects a moving amount of the printing apparatus 1 with respect to a printing medium M on the printing medium M, and a print area 102a of a printer 102 described later that performs printing on the printing medium M.

The housing 100 corresponds to a main body of the printing apparatus 1, and is formed in a cuboid shape, for example, so that a user can hold the housing 100 easily.

The housing 100 includes an upper surface 100a and a lower surface 100b.

Note that the housing 100 may take any shape as long as a user can hold the housing 100 easily, and is not limited to the cuboid shape. The housing 100 may be formed in a hemispherical shape.

On the lower surface 100b of the housing 100, a moving amount detector 101 and a print area 102a are provided, as illustrated in FIG. 2.

The moving amount detector 101 is exposed to outside of the housing 100 through a first opening area 100c provided in the lower surface 100b.

The print area 102a is an area which has a substantially rectangular shape and is exposed to outside of the housing 100 through a second opening area 100d provided in the lower surface 100b, and extends in the y-axis direction. The print area 102a illustrated in FIG. 2 is specifically an area in which a plurality of ink nozzles included in the printer 102 as a printing mechanism that performs printing on the printing medium M is arranged.

The moving amount detector 101 comprises, for example, a laser optical sensor, and detects the moving amount of the printing apparatus 1 with respect to the printing medium M.

Specifically, the laser optical sensor irradiates a surface of the printing medium M with laser light, and captures an image of an interference pattern formed by the laser light reflected at the surface of the printing medium M by an image sensor. The laser optical sensor detects the moving amount of the printing apparatus 1 by analyzing captured image of the interference pattern.

The plurality of ink nozzles arranged on the print area 102a as the printing mechanism prints the image to be printed on the printing medium M, in an ink-jet method in which an ink in fine droplet is discharged on the printing medium M.

Each ink nozzle arranged on the print area 102a is filled with an ink supplied from an ink tank not illustrated in the drawings. Each ink nozzle adopts a method in which printing is performed by discharging an ink in a thermal method, for example. As the ink in the ink nozzles are heated by a heater, bubbles are generated. As these bubbles bursts, the ink is discharged to the printing medium M through the ink nozzles, and printing is performed.

Note that each ink nozzle arranged on the print area 102a may adopt a piezo method in which printing is performed by discharging ink through the ink nozzles by means of a piezo element.

The plurality of ink nozzles arranged on the print area 102a can print the image to be printed in various printing widths.

The printing width is a length of the image to be printed in the y-axis direction.

Furthermore, the plurality of ink nozzles arranged on the print area 102a can print the image to be printed at various printing positions.

For example, the plurality of ink nozzles arranged on the print area 102a can perform "top aligning printing" that prints the image to be printed at a printing position at which the back end of the print area 102a matches the back end of the image to be printed.

The plurality of ink nozzles arranged on the print area 102a can perform "bottom aligning printing" that prints the image to be printed at a printing position at which the front end of the print area 102a matches the front end of the image to be printed.

The length Lb of the print area 102a in the y-axis direction corresponds to a maximum value of a range in the y-axis direction in which the image to be printed can be printed by the plurality of ink nozzles arranged on the print area 102a in a single movement.

The upper surface 100a of the housing 100 is a surface facing the lower surface 100b.

A printing start button 103 is provided on the upper surface 100a, as illustrated in FIG. 3A and FIG. 3B.

The printing start button 103 is a switch to receive an instruction operation by a user to start printing. When this printing start button 103 is pressed down by the user, for example, the start of printing is instructed.

The printing start button 103 has a shape to protrude towards an upper direction from the upper surface 100a, for example. The printing start button 103 may be a push-button switch that receives an instruction to start printing when it is pressed inside as a user presses it down or may be a touch switch that receives an instruction to start printing when it detects a touch by a user when the user touches it.

The printing start button 103 is, as illustrated in FIG. 3A, provided with an oval recess 103a on a center portion of the printing start button 103 in the y-axis direction so that a user can easily put his or her finger on, for example.

The length of the oval recess 103a in the y-axis direction is shorter than the length of the printing start button 103 in the y-axis direction. As described later, the length La of the printing start button 103 in the y-axis direction is equal or substantially equal to the length Lb of the print area 102a in the y-axis direction. Although the printing start button 103 is provided with the oval recess 103, because the length of the oval recess 103 in the y-axis direction is shorter than the length of the printing start button 103 in the y-axis direction, both ends of the printing start button 103 in the y-axis direction can still be seen from outside. Accordingly, although the printing start button 103 is provided with the oval recess 103a, a user can intuitively grasp the position and the size of the print area 102a by viewing the printing start button 103.

It should be noted that a mark such as a dot, with which a user can recognize the center Ca of the printing start button 103, may be displayed (printed) on the oval recess 103a.

It should be noted that the printing start button 103 may be formed in substantially a rectangular shape, which is not provided with an oval recess, as illustrated in FIG. 3B.

The printing start button 103 is provided directly above the print area 102a. In other words, the print area 102a is provided directly below the printing start button 103.

That is, a reference line V passing through the center Ca of the printing start button 103 and a center Cb of the print area 102a is orthogonal to the lower surface 100b.

Therefore, the x-coordinate and the y-coordinate of the center Ca of the printing start button 103 respectively match the x-coordinate and the y-coordinate of the center Cb of the print area 102a.

Accordingly, the printing start button 103 corresponds to a guiding mechanism that represents the position of the print area 102a.

The size of the printing start button 103 is equal or substantially equal to the size of the print area 102a.

Specifically, the length La of the printing start button 103 in the y-axis direction is equal or substantially equal to the length Lb of the print area 102a in the y-axis direction.

When viewed in the direction along the reference line V, the printing start button 103 and the print area 102a overlap with each other in such a manner that the printing start button 103 includes the print area 102a therein, for example.

As described above, the length Lb of the print area 102a in the y-axis direction corresponds to the range in the y-axis direction in which the print area 102a can print the image to be printed in a single movement. Therefore, the length La of the printing start button 103 in the y-axis direction represents the range in the y-axis direction in which the plurality of ink nozzles arranged on the print area 102a can, in a single movement, print the image to be printed.

When printing by means of the printing apparatus 1, a user has to first move the printing apparatus 1 while viewing the printing start button 103, to set the desired position as the start position of printing.

Hereinafter, the functions played by the printing start button 103 in a case where the desired position is set as the start position of printing are described with reference to FIG. 4A, FIG. 4B, FIG. 5A, and FIG. 5B.

Specifically, the following describes an example in which a user desires to set the position A in the printing medium M as the start position of printing.

Before starting printing, a user first places the printing apparatus 1 so that the lower surface 100b of the housing 100 is in contact with the printing medium M and faces the printing medium M. By doing so, the print area 102a provided on the lower surface 100b is hidden by the housing 100. Nevertheless, the printing start button 103 provided on the upper surface 100a of the housing 100 can still be viewed by the user, as illustrated in FIG. 4A, FIG. 4B, FIG. 5A, and FIG. 5B.

The user moves the printing apparatus 1 on the printing medium M while viewing the printing start button 103, and as illustrated in FIG. 4A, places the printing apparatus 1 on the printing medium M so that the x-coordinate and the y-coordinate of the center Ca of the printing start button 103 respectively match the x-coordinate Xa and the y-coordinate Ya of the position A in the printing medium M.

As described above, the x-coordinate and the y-coordinate of the center Ca of the printing start button 103 respectively match the x-coordinate and the y-coordinate of the center Cb of the print area 102a.

Figure 5B:
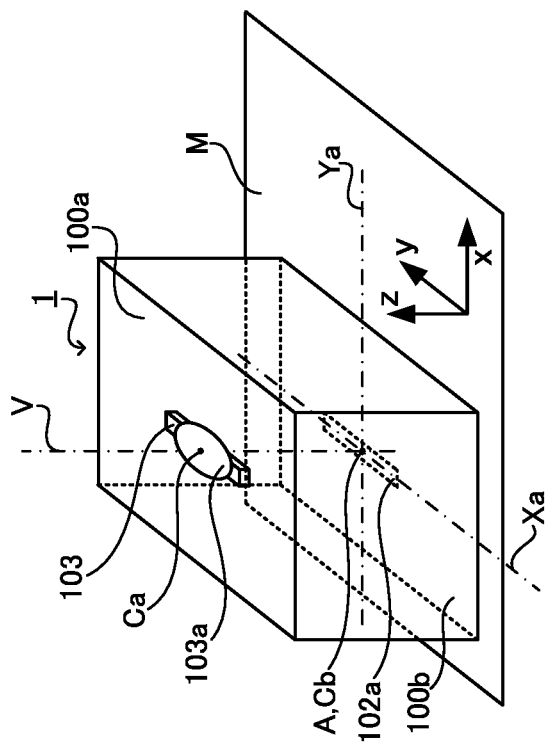
FIG. 5A and FIG. 5B are each a perspective view to show a function played by the printing start button in the printing using the printing apparatus according to Embodiment 1 of the present disclosure, where
Figure 5A:
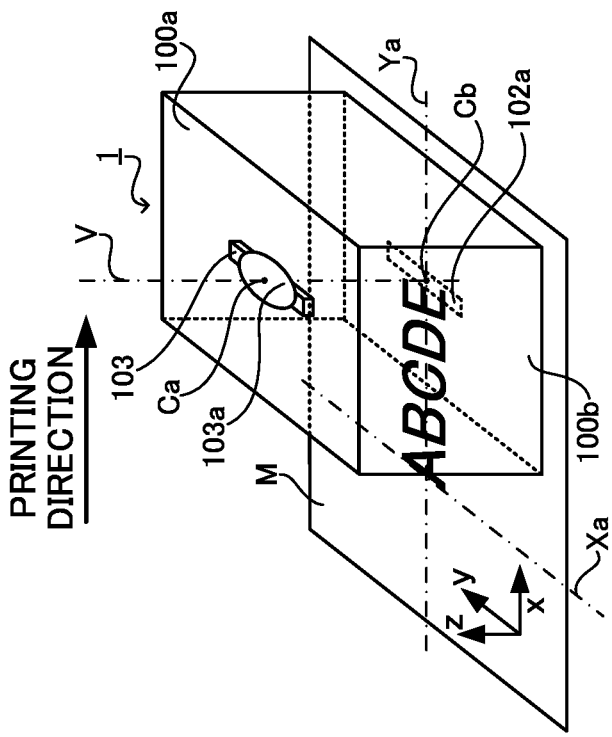

Therefore, as illustrated in FIG. 5A, the x-coordinate and the y-coordinate of the center Cb of the print area 102a also respectively match the x-coordinate Xa and the y-coordinate Ya of the position A.

As a result, the position A is set as the start position of printing.

In this state, the user instructs start of printing by pressing down the printing start button 103. Then, as the user moves the printing apparatus 1 in the printing direction illustrated in FIG. 4B and FIG. 5B, the text "ABCDE", which is the image to be printed, is printed on the printing medium M with the position A serving as the start position of printing, as illustrated in FIG. 4B and FIG. 5B.

A user usually moves the printing apparatus 1 on the printing medium M by holding the printing apparatus 1 while placing his or her finger on the printing start button 103. In this state, the user can intuitively set the position A in the printing medium M as the start position of printing, by performing an easy operation as if to point at the position A by the finger placed on the printing start button 103.

As described above, the length La of the printing start button 103 in the y-axis direction represents the range in the y-axis direction in which the plurality of ink nozzles arranged on the print area 102a can, in a single movement, print the image to be printed.

For this reason, the user can properly set the start position of printing in the y-axis direction by moving the printing apparatus 1 while grasping the range in the y-axis direction in which the plurality of ink nozzles arranged on the print area 102a can, in a single movement, print the image to be printed by viewing the printing start button 103.

Specifically, when the printing medium M is a medium on which ruled lines are printed such as a notebook or a writing paper, a user can set the printing position so that the image to be printed can fit between the ruled lines, by placing the printing apparatus 1 so that the printing start button 103 fits between the ruled lines in the y-axis direction.

As described above, the printing start button 103 is provided directly above the print area 102a.

Therefore, when the user presses down the printing start button 103 to instruct start of printing, the plurality of ink nozzles arranged on the print area 102a provided directly below the printing start button 103 will be pushed down towards the printing medium M.

This suppresses degrading of a printing quality due to the plurality of ink nozzles arranged on the print area 102a floated from the printing medium M when printing.

Figure 6:
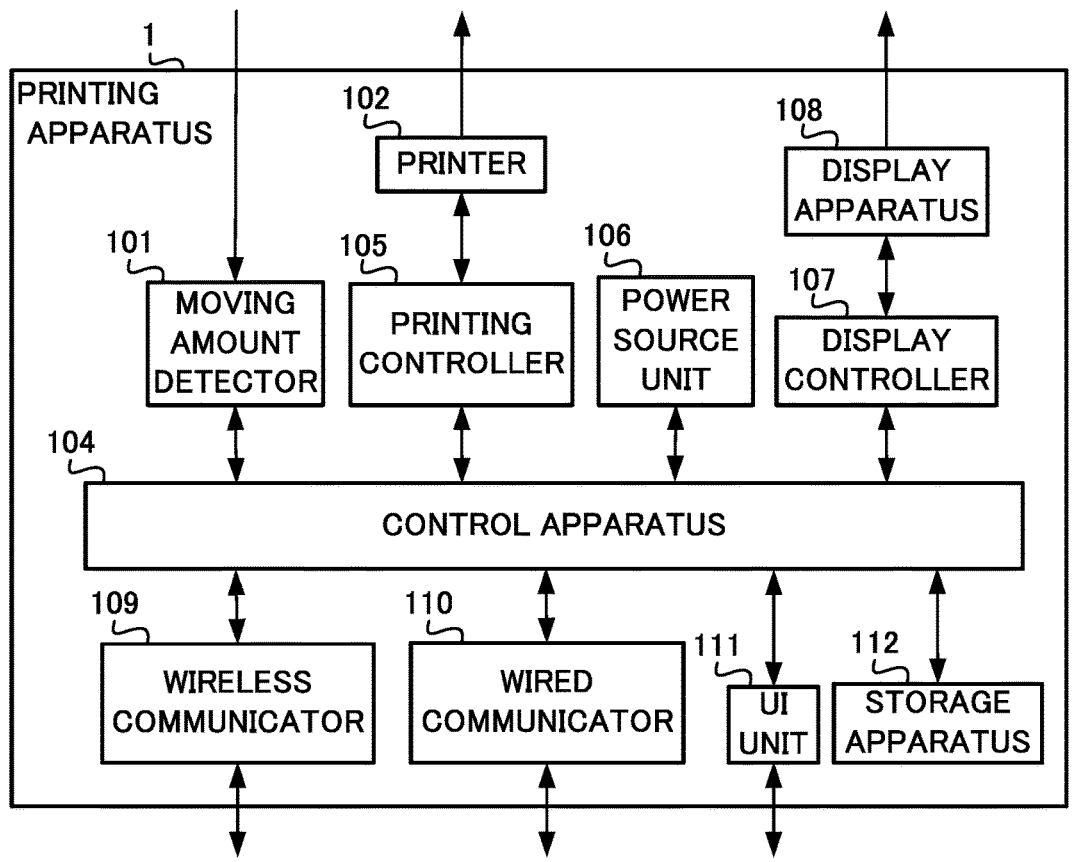
FIG. 6 is a diagram illustrating a hardware configuration of the printing apparatus according to Embodiment 1 of the present disclosure.

As illustrated in FIG. 6, the printing apparatus 1, in addition to each component described above, includes a printer 102, a control apparatus 104, a printing controller 105, a power source unit 106, a display controller 107, a display apparatus 108, a wireless communicator 109, a wired communicator 110, a user interface (UI) unit 111, and a storage apparatus 112.

The control apparatus 104 comprises a central processing unit (CPU), and executes various types of processing according to the programs and data stored in the storage apparatus 112.

The control apparatus 104 is connected to each unit of the printing apparatus 1 via a system bus being a transmission path of commands and data, and controls the entire printing apparatus 1.

The printing controller 105, in accordance with control by the control apparatus 104, controls the ink discharge by each of the plurality of ink nozzles arranged on the print area 102a on the printer 102. Specifically, the printing controller 105 comprises a driver integrated circuit (IC), and thermally drives heaters respectively included in the plurality of ink nozzles arranged on the printer 102, in accordance with a print data described later stored in the storage apparatus 112, thereby causing any of the plurality of ink nozzles arranged on the print area 102a to discharge ink appropriately.

The power source unit 106 comprises a power source such as a power source IC, a battery cell or a battery, and a power source controlling circuit that controls this power source, and supplies power to respective units of the printing apparatus 1, in accordance with control by the control apparatus 104.

The display controller 107 controls the display apparatus 108, in accordance with control by the control apparatus 104.

The display apparatus 108 comprises a display device such as a liquid crystal display (LCD) panel, and displays various types of images on the display device, in accordance with control by the display controller 107.

The wireless communicator 109 comprises a wireless communication device such as a Bluetooth (registered trademark) module or a wireless local area network (WLAN) module, and transmits and receives various types of data by performing wireless communication with external apparatuses such as a personal computer (PC) or a smartphone.

The wired communicator 110 comprises a wired communication device such as a universal serial bus (USB) port, and transmits and receives various types of data by performing wired communication with external apparatuses such as a PC or a smartphone.

The UI unit 111 comprises an input device such as a keyboard, a mouse, a button, an operation key, a switch, a touchpad, or a touch panel, and receives an input operation by a user.

The UI unit 111 supplies, to the control apparatus 104, data representing contents of the input.

The storage apparatus 112 comprises random access memory (RAM), read only memory (ROM), and a controlling circuit that controls the RAM and the ROM, none of which is illustrated in the drawings, and stores various types of programs and various types of data.

The storage apparatus 112 supplies, to the control apparatus 104, the various types of programs and the various types of data stored therein. Specifically, the RAM stores the data generated by the control apparatus 104 by executing various types of processing, in accordance with control by the controlling circuit.

The RAM supplies the data stored therein, to the control apparatus 104, in accordance with control by the controlling circuit. The RAM also functions as a work area of the control apparatus 104. That is, the control apparatus 104 expands the programs or data stored in the ROM, in the RAM, and executes the various types of processing by referring to the expanded programs or data.

The ROM stores various types of programs and various types of data, which are used by the control apparatus 104 to execute the various types of processing. Specifically, the ROM stores therein the programs for controlling the entire printing apparatus 1, which is executed by the control apparatus 104. The ROM further stores therein data representing various types of setting for printing, such as a character font and a character size. The ROM further stores therein print data. The print data is data representing the image to be printed.

The print data is generated in an external apparatus such as a PC or a smartphone by receiving an input of printing content by a user by means of an input device such as a keyboard.

The printing apparatus 1 acquires, from the external apparatus, the print data by means of the wireless communicator 109 or the wired communicator 110, and stores this print data in the ROM.

Hereinafter, a printing processing executed by the printing apparatus 1 having the above-described configuration is described with reference to FIG. 7.

The printing apparatus 1 acquires, in advance, the print data from an external apparatus such as a PC or a smartphone by means of the wireless communicator 109 or the wired communicator 110, and stores the print data in the ROM included in the storage apparatus 112.

A user, while viewing the printing start button 103, holds and moves the printing apparatus 1 on the printing medium M, and places the printing apparatus 1 on the printing medium M so that the x-coordinate Xa and the y-coordinate Ya of the desired position A on the printing medium M respectively match the x-coordinate and the y-coordinate of the center of the printing start button 103, thereby setting the position A as the start position of printing.

Figure 7:
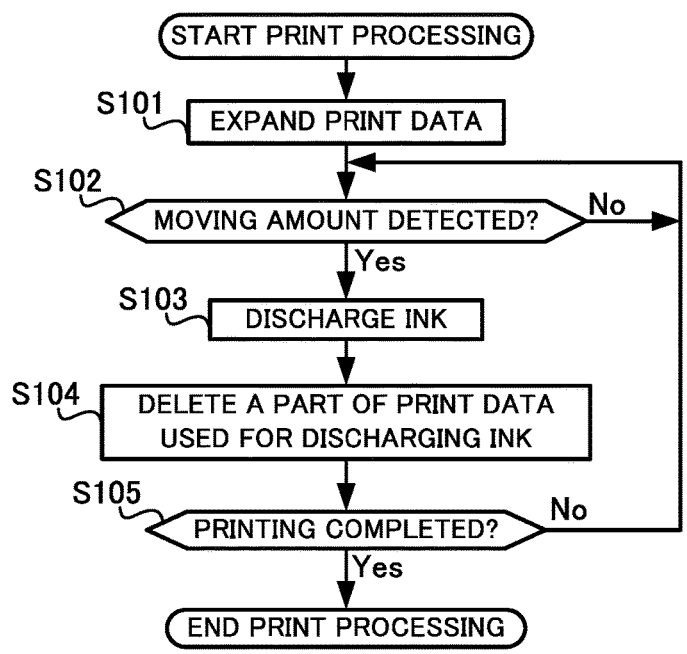
FIG. 7 is a flowchart to show the printing processing performed by the printing apparatus according to Embodiment 1 of the present disclosure.

In this state, when the user instructs start of printing by pressing down the printing start button 103, the control apparatus 104 starts printing processing as illustrated in the flowchart of FIG. 7.

When the printing processing is started, the control apparatus 104 expands the print data stored in the ROM included in the storage apparatus 112, in the RAM included in the storage apparatus 112 (Step S101).

Next, the control apparatus 104 determines whether the moving amount detector 101 detects a moving amount of the printing apparatus 1 (Step S102).

In a case where the control apparatus 104 determines that moving amount is not detected (Step S102; No), the processing returns to Step S102, and waits for detection of a moving amount.

When the user holds and moves the printing apparatus 1 on the printing medium M in the printing direction, the control apparatus 104 determines that a moving amount is detected, in response (Step S102; Yes).

The control apparatus 104 performs printing by discharging ink from any of the plurality of ink nozzles arranged on the print area 102a, in accordance with the detected moving amount and the print data expanded in the RAM in Step S101 (Step S103).

The control apparatus 104 deletes a part of the print data used for discharging the ink in Step S103, from the RAM (Step S104).

Then, the control apparatus 104 determines whether the printing is completed, by determining whether there is any print data left in the RAM (Step S105).

In a case where the control apparatus 104 determines that the printing is not completed (Step S105; No), the processing returns to Step S102.

The control apparatus 104 prints the print data on the printing medium M, by repeating the processing in Steps S102 to S105 until determining that the printing is completed.

On the other hand, in a case where the control apparatus 104 determines that the printing is completed (Step S105; Yes), the control apparatus 104 ends the printing processing.

As described above, in the printing performed by the printing apparatus 1, a user can cause the x-coordinate and the y-coordinate of the print area 102a to match the x-coordinate Xa and the y-coordinate Ya of the desired position A by performing an easy operation to place the printing apparatus 1 so that the x-coordinate and the y-coordinate of the center Ca of the printing start button 103 respectively match the x-coordinate Xa and the y-coordinate Ya of the position A.

Consequently, the user can intuitively set the position A in the printing medium M as the start position of printing.

The user can properly set the start position of printing of the image to be printed in the y-axis direction, by placing the printing apparatus 1 while viewing the printing start button 103.

By pressing down of the printing start button 103 provided directly above the print area 102a, the plurality of ink nozzles arranged on the print area 102a is pushed against the printing medium M. This suppresses degrading of the printing quality due to the plurality of ink nozzles arranged on the print area 102a floating from the printing medium M when printing.

It should be noted that the size of the printing start button 103 in Embodiment 1 is described to be equal or substantially equal to the size of the print area 102a. However, this is merely an example, and the size of the printing start button 103 may be different from the size of the print area 102a, as long as a user recognizes these sizes to be substantially equal to each other. Specifically, in Embodiment 1, the length La of the printing start button 103 in the y-axis direction is described to be equal or substantially equal to the length Lb of the print area 102a in the y-axis direction. However, the length La of the printing start button 103 in the y-axis direction may be different from the length Lb of the print area 102a in the y-axis direction, as long as the user recognizes these lengths to be substantially equal to each other. That is, the printing start button 103 may have any size as long as it is substantially equal to the size of the print area 102a and the user recognizes these sizes to be substantially equal to each other.

Furthermore, the size of the printing start button 103 may be larger or smaller than the size of the print area 102a, beyond an extent in which the user recognizes it to be substantially equal to the size of the print area 102a. Even in such a case, because the printing start button 103 is provided directly above the print area 102a, the user can still intuitively set the desired position A in the printing medium M as the start position of printing, by performing an easy operation to place the printing apparatus 1 so that the x-coordinate and the y-coordinate of the center Ca of the printing start button 103 respectively match the x-coordinate Xa and the y-coordinate Ya of the position A in the printing medium M.

In Embodiment 1, the printing start button 103 and the print area 102a are described to overlap with each other in such a manner that the printing start button 103 includes the print area 102a therein, when viewed in the direction along the reference line V. However, this is merely an example, and the printing start button 103 and the print area 102a may, depending on whether shapes and arrangements thereof are the same or different, overlap with each other in such a manner that the print area 102a includes the printing start button 103 therein, when viewed in the direction along the reference line V.

Embodiment 2

In Embodiment 1, the printing start button 103 is described to be provided directly above the print area 102a. However, this is merely an example.

Any component which makes setting of the start position of printing by a user easy may be provided directly above the print area 102a.

Hereinafter, a printing apparatus 2 in which a printing start button 114 comprising a light emitting apparatus 113 is provided directly above the print area 102a is described with reference to FIGS. 8A and 8B to FIGS. 10A and 10B.

Figure 8A:
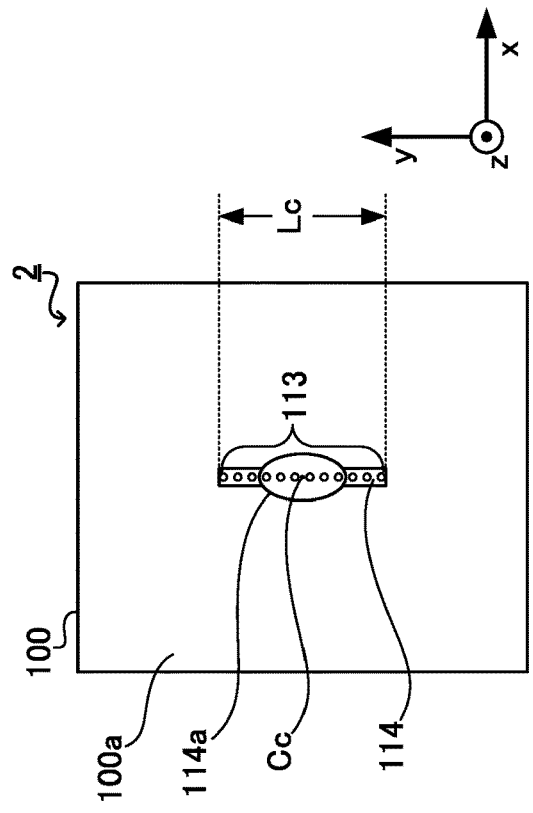
FIG. 8A and FIG. 8B are each a top view of a printing apparatus according to Embodiment 2 of the present disclosure, where
Figure 8B:
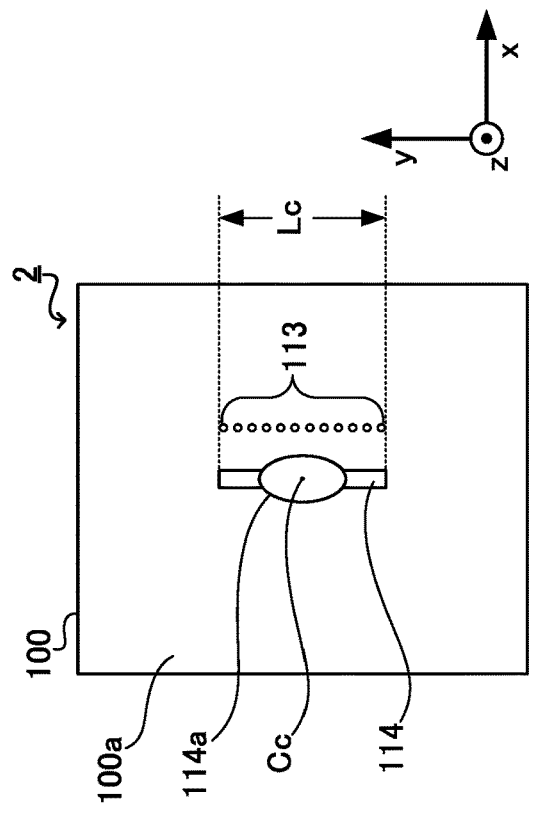

The printing apparatus 2, while having substantially the same configuration as the printing apparatus 1, differs from the printing apparatus 1, as illustrated in FIG. 8A, in that the printing start button 114 that comprises the light emitting apparatus 113 is provided directly above the print area 102a, instead of the printing start button 103. For example, as illustrated in FIG. 8A and FIG. 8B, as is same with the printing start button 103, the printing start button 114 is provided with an oval recess 114a on a center portion of the printing start button 114 in the y-axis direction so that a user can easily put his or her finger on. The length of this oval recess 114a in the y-axis direction is shorter than the length of the printing start button 114 in the y-axis direction.

It should be noted that in the present embodiment, the light emitting apparatus 113 is not limited to a configuration in which it is included in the printing start button 114; as illustrated in FIG. 8B, another configuration is also possible in which the light emitting apparatus 113 is provided near the printing start button 114 at a position separated from the printing start button 114, for example along the y-axis direction.

In a case where the light emitting apparatus 113 is included in the printing start button 114, when a user places his or her finger on the printing start button 114, a part of the light emitting apparatus 113 is hidden. On the other hand, in a case where the light emitting apparatus 113 is separated from the printing start button 114, even in a state in which the user places his or her finger on the printing start button 114, the light emitting apparatus 113 is not hidden.

Hereinafter, the printing apparatus 2 illustrated in FIG. 8A is described mainly focusing on its differences from the printing apparatus 1.

The printing start button 114 is a switch to receive an instruction operation by a user to start printing.

A reference line V passing through the center Cc of the printing start button 114 and the center Cb of the print area 102a is orthogonal to the lower surface 100b.

When viewed in the direction along the reference line V, the printing start button 114 overlaps with the print area 102a so that the printing start button 114 includes the print area 102a therein.

A size of the printing start button 114 is substantially equal to the size of the print area 102a. Specifically, a length Lc of the printing start button 114 in the y-axis direction is substantially equal to the length Lb of the print area 102a in the y-axis direction.

It should be noted that a mark such as a dot, with which a user can recognize that the center Cc is a center of the printing start button 114, may be displayed (printed) on the center Cc of the printing start button 114.

It should be noted that a plurality of light sources 113A to 113L that constitutes the light emitting apparatus 113 described later may be provided so that any of the light sources 113A to 113L may serve as the center Cc.

Specifically, the light source functioning as the center Cc may be configured to be larger than the other light sources, or to emit light whose color is different from that of light emitted by other light sources, for example, so that a user can easily recognize that the light source is the center Cc.

The printing start button 114 comprises a light emitting apparatus 113.

The light emitting apparatus 113, in accordance with control by the control apparatus 104, emits light in a mode which represents a size of the image to be printed at the time of printing and a position of the image to be printed at the time of printing.

Hereinafter, the light emitting apparatus 113 is described with reference to FIG. 9.

Figure 9:
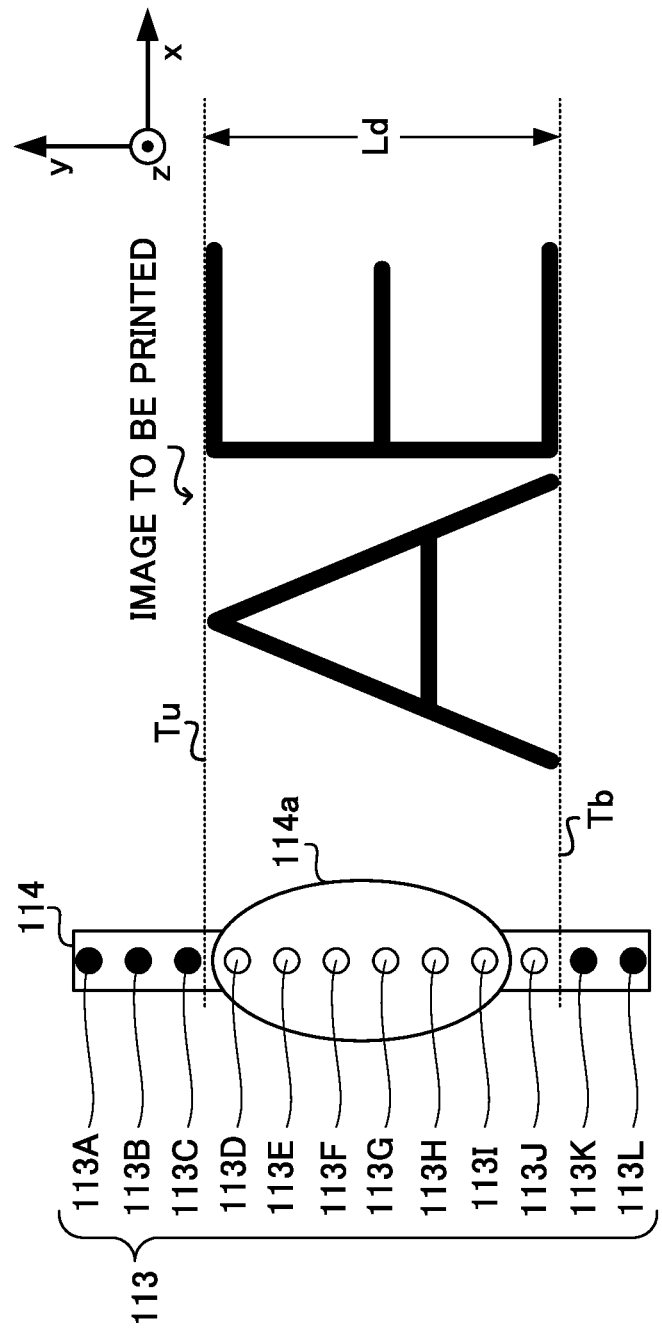
FIG. 9 is a diagram to show a function of a light emitting apparatus included in the printing apparatus according to Embodiment 2 of the present disclosure.

As illustrated in FIG. 9, the light emitting apparatus 113 comprises a plurality of light sources 113A to 113L linearly arranged along the y-axis direction.

Each light source 113A to 113L is a light emitting diode (LED), for example.

The light emitting apparatus 113 emits light in a mode that represents the printing width Ld and the printing position of the image to be printed in the y-axis direction, by illuminating any of the light sources 113A to 113L in accordance with the printing width Ld and the printing position of the image to be printed in the y-axis direction, according to control by the control apparatus 104.

Hereinafter, an example in which the plurality of ink nozzles arranged on the print area 102a prints the image to be printed having a printing width Ld set by a user by operating the UI unit 111, at the printing position in the y-axis direction set by the user by operating the UI unit 111 is described.

The control apparatus 104 acquires, from the UI unit 111, setting data representing the printing width Ld and the printing position in the y-axis direction set by the user.

A light source position data, which represents positions of the light sources 113A to 113L on the light emitting apparatus 113, is stored in the ROM of the storage apparatus 112, and the control apparatus 104 acquires, from the storage apparatus 112, the light source position data, which represents the positions of the light sources 113A to 113L on the light emitting apparatus 113.

On the basis of the setting data and the light source position data, the control apparatus 104 identifies, from among the light sources 113A to 113L, light sources which are in a distance range between a back end Tu and a front end Tb of the image to be printed. For example, the control apparatus 104 identifies the light source 113D to the light source 113J.

As illustrated in FIG. 9, the light emitting apparatus 113 lights the light sources 113D to 113J which are identified by the control apparatus 104.

The lighted light source 113D to light source 113J form a straight line along the y-axis direction.

A length of this straight line roughly represents a printing width Ld, and a position of this straight line in the y-axis direction roughly represents the printing position of the image to be printed in the y-axis direction.

That is, the light emitting apparatus 113, in accordance with control by the control apparatus 104, emits light in a mode roughly representing the printing width Ld and the printing position of the image to be printed in the y-axis direction.

In printing using the printing apparatus 2, the user moves the printing apparatus 2 while viewing the printing start button 114.

Hereinafter, function played by the printing start button 114 in printing using the printing apparatus 2 is described with reference to FIG. 10.

Hereinafter, an example in which a user desires to set the position A in the printing medium M as the start position of printing is described.

In printing using the printing apparatus 2, in a case where the light source 113B to the light source 113F are lighted, the user moves the printing apparatus 2 while viewing the printing start button 114, and as illustrated in FIG. 10A, places the printing apparatus 2 on the printing medium M so that the x-coordinate and the y-coordinate of the light source 113F of the printing start button 114 respectively match the x-coordinate Xa and the y-coordinate Ya of the position A in the printing medium M.

By doing so, the x-coordinate and the y-coordinate of a front end in the y-axis direction of the printing position printed by the plurality of ink nozzles arranged on the print area 102a also match the x-coordinate Xa and the y-coordinate Ya of the position A. As a result, the position A in the printing medium M is set as the start position of printing.

In this state, the user presses down the printing start button 114, to instruct start of printing. Then, the user moves the printing apparatus 2 in the printing direction as illustrated in FIG. 10B. As a result, the text "ABC", which is the image to be printed, is printed with the position A in the printing medium M serving as the start position of printing, as illustrated in FIG. 10B.

The text "ABC" has a printing width Ld represented by the mode of light emission by the light emitting apparatus 113, and is printed at the printing position in the y-axis direction represented by the mode of light emission by the light emitting apparatus 113.

The user can properly set the printing position of the image to be printed in the y-axis direction by moving and placing the printing apparatus 2 while grasping the printing width Ld and the printing position of the image to be printed in the y-axis direction by viewing the mode of light emission by the light emitting apparatus 113.

As described above, the printing start button 114 is provided directly above the print area 102a.

For this reason, when the user presses down the printing start button 114 to instruct start of printing, the plurality of ink nozzles arranged on the print area 102a provided directly below the printing start button 114 is pressed down towards the printing medium M.

This suppresses degrading of the printing quality due to the plurality of ink nozzles arranged on the print area 102a floating from the printing medium M when printing.

It should be noted that, in Embodiment 2, the light emitting apparatus 113 is described to comprise a plurality of light sources 113A to 113L. However, this is merely an example, and the light emitting apparatus 113 may include more light sources.

The light emitting apparatus 113 may be configured by any light emitter such as a light bulb.

It should be noted that, in Embodiment 2, the length Ld of the image to be printed in the main scanning direction is described to be set by a user. However, this is merely an example, and the printing apparatus 2 may set the printing width Ld of the image to be printed.

For example, when the image to be printed is text, the printing apparatus 2 may set the printing width Ld, according to character decoration and character font set by the user by operating the UI unit 111.

It should be noted that, in Embodiment 2, the size of the printing start button 114 is described to be equal or substantially equal to the size of the print area 102a. However, this is merely an example, and the size of the printing start button 114 may be different from the size of the print area 102a, as long as a user recognizes these sizes to be substantially equal to each other. Specifically, in Embodiment 2, the length Lc of the printing start button 114 in the y-axis direction is described to be equal or substantially equal to the length Lb of the print area 102a in the y-axis direction. However, the length Lc of the printing start button 114 in the y-axis direction may be different from the length Lb of the print area 102a in the y-axis direction, as long as the user recognizes that they are substantially equal to each other. In other words, the printing start button 114 may have any size as long as it is substantially equal to the size of the print area 102a and the user recognizes these sizes to be substantially equal to each other.

Furthermore, the size of the printing start button 114 may be larger or smaller than the size of the print area 102a, beyond an extent in which the user recognizes it to be substantially equal to the size of the print area 102a. Even in such a case, because the printing start button 114 is provided directly above the print area 102a, the user can still intuitively set the position A in the printing medium M as the start position of printing, by performing an easy operation to place the printing apparatus 1 to cause the x-coordinate and the y-coordinate of the position of an end of the light emitting apparatus 113 of the printing start button 114 to respectively match the x-coordinate Xa and the y-coordinate Ya of the desired position A in the printing medium M.

The user can properly set the printing position of the image to be printed in the y-axis direction, by moving and placing the printing apparatus 2 while grasping the printing width Ld and the printing position of the image to be printed in the y-axis direction by viewing the mode of light emission by the light emitting apparatus 113.

In Embodiment 1, the printing start button 114 and the print area 102a are described to overlap with each other in such a manner that the printing start button 114 includes the print area 102a therein, when viewed in the direction along the reference line V. However, this is merely an example, and the printing start button 114 and the print area 102a may, depending on whether the shapes and the arrangements thereof are the same or different, overlap with each other in such a manner that the print area 102a includes the printing start button 114 therein, when viewed in the direction along the reference line V.

Embodiment 3

In Embodiment 1, the printing start button 103 is described to be provided directly above the print area 102a.

In Embodiment 2, the printing start button 114 that includes the light emitting apparatus 113 is described to be provided directly above the print area 102a.

However, these are merely an example, and any component may be placed directly above the print area 102a.

Hereinafter, a printing apparatus 3 in which the display area 115 of the display device included in the display apparatus 108 is provided in an area including a position directly above the print area 102a is described with reference to FIGS. 11A and 11B and FIGS. 12A and 12B.

The printing apparatus 3, while having substantially the same configuration as the printing apparatus 1, differs from the printing apparatus 1, as illustrated in FIG. 11A, in that the display area 115 of the display device included in the display apparatus 108 is placed in an area including the position directly above the print area 102a, instead of the printing start button 103.

Hereinafter, the printing apparatus 3 is described mainly focusing on its differences from the printing apparatus 1.

The display area 115 is provided in an area of the upper surface 100a of the housing 100, including the position directly above the print area 102a.

Various types of images are displayed on the display area 115, in accordance with control by the control apparatus 104. Specifically, a first image Ia, a second image Ib, a third image Ic, and a fourth image Id are displayed on the display area 115, as illustrated in FIG. 11A.

The first image Ia is an image displayed to represent the position of the print area 102a, which is specifically an image that represents an outer shape of the print area 102a. The first image Ia indicates the position of the print area 102a to a user, and corresponds to a first guiding image. The first image Ia is displayed directly above the print area 102a. In other words, the print area 102a is provided directly below the first image Ia.

That is, the reference line V passing through a center Ce of the first image Ia and the center Cb of the print area 102a is orthogonal to the lower surface 100b.

Therefore, the x-coordinate and the y-coordinate of the center Ce of the first image Ia respectively match the x-coordinate and the y-coordinate of the center Cb of the print area 102a.

The size of the first image Ia is equal or substantially equal to the size of the print area 102a.

Specifically, a length Le of the first image Ia in the y-axis direction is equal or substantially equal to the length Lb of the print area 102a in the y-axis direction. When viewed in the direction along the reference line V, the first image Ia and the print area 102a overlap with each other in such a manner that the first image Ia includes the print area 102a therein.

As described above, the length Lb of the print area 102a in the y-axis direction corresponds to the range in the y-axis direction in which the print area 102a can print an image to be printed. That is, the length Le of the first image Ia in the y-axis direction represents the range in the y-axis direction in which the print area 102a can print the image to be printed.

It should be noted that a mark such as a dot, with which a user can recognize that the center Ce is the center of the first image Ia, may be displayed on the center Ce of the first image Ia.

The control apparatus 104 displays the first image Ia on the display area 115 on the basis of a display data, which is stored in the storage apparatus 112 in advance, representing the display position and the display size of the first image Ia.

The second image Ib to the fourth image Id are images representing the size of the image to be printed at the time of printing and the position of the image to be printed at the time of printing, and correspond to a second guiding image which indicates, to a user, the size and the position of the image at the time of printing.

Specifically, the second image Ib is an image that represents the image to be printed.

The display apparatus 108 displays the second image Ib on the display area 115, at a position at which the y-coordinate of the second image Ib matches the printing position of the image to be printed in the y-axis direction.

The display apparatus 108 displays the second image Ib on the display area 115 so that the length of the second image Ib in the y-axis direction matches the printing width Ld.

The third image Ic is an image that represents the position of a back end of the image to be printed in the y-axis direction.

The fourth image Id is an image that represents the position of a front end of the image to be printed in the y-axis direction.

That is, a user can grasp the printing width Ld and the printing position of the image to be printed in the y-axis direction, by viewing the second image Ib to the fourth image Id.

It should be noted that the display apparatus 108 is not limited to a mode displaying the above-described image on the display area 115.

For example, the display apparatus 108 may display a fifth image Ie as illustrated in FIG. 11B.

The fifth image Ie has a size which is the same with that of the first image Ia, and is displayed at a position which is the same with that of the first image Ia, and represents the position of the print area 102a. Furthermore, the fifth image Ie is an image in which density, color, and the like of an area between the position of the back end and the position of the front end in the y-axis direction of the image to be printed in the printing medium M in the fifth image Ie differs from the density, color, and the like of other areas. Accordingly, a user can grasp the printing width Ld and the printing position of the image to be printed in the y-axis direction, by viewing the fifth image Ie.

Hereinafter, an example in which the printing width Ld and the printing position of an image to be printed in the y-axis direction are set by a user by operating the UI unit 111 is described.

The control apparatus 104 acquires, from the UI unit 111, the setting data representing the printing width Ld and the printing position of an image to be printed in the y-axis direction set by the user.

The control apparatus 104 displays the second image Ib, the third image Ic, and the fourth image Id, on the display area 115 of the display apparatus 108, according to the printing width Ld and the printing position in the y-axis direction represented by the setting data.

In printing using the printing apparatus 3, the user sets the start position of printing by moving the printing apparatus 3 on the printing medium M, while viewing the first image Ia to the fourth image Id displayed on the display area 115. Then, the user starts printing.

Hereinafter, the function played by the first image Ia to the fourth image Id displayed on the display area 115 in printing using the printing apparatus 3 is described with reference to FIGS. 12A and 12B.

Hereinafter, an example in which the user desires to set the position A in the printing medium M as the start position of printing is described.

In printing, a user places the printing apparatus 3 so that the lower surface 100b of the housing 100 is in contact with the printing medium M and faces the printing medium M.

Accordingly, the print area 102a provided on the lower surface 100b is hidden by the housing 100. Nonetheless, the first image Ia to the fourth image Id displayed on the display area 115 provided on the upper surface 100a of the housing 100 can still be viewed by the user, as illustrated in FIG. 12A.

Figure 12B:
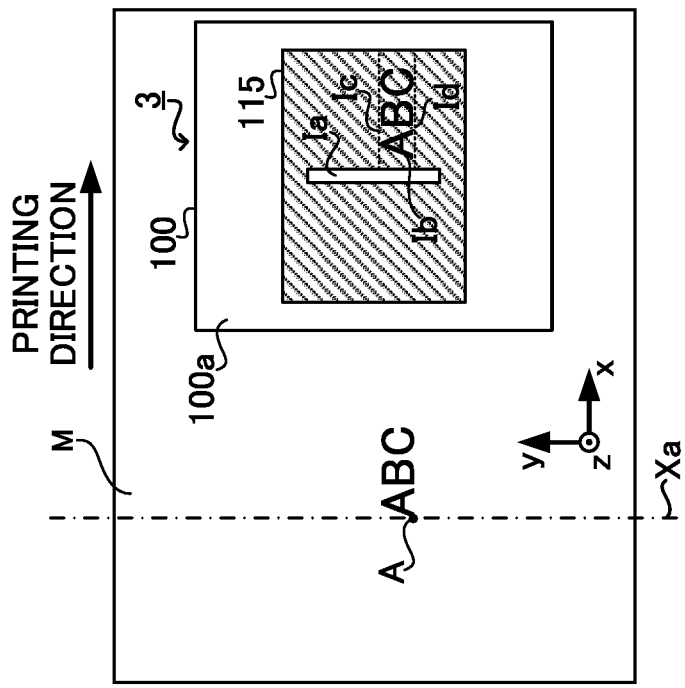
FIG. 12A and FIG. 12B are each a top view to show a function played by an image displayed on the display apparatus in the printing using the printing apparatus according to Embodiment 3 of the present disclosure, where
Figure 12A:
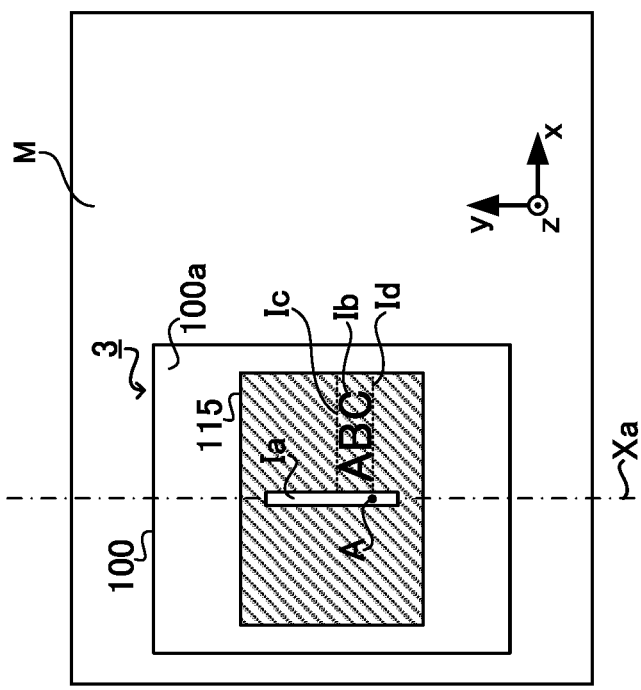

Consequently, the user moves the printing apparatus 3 on the printing medium M while viewing the first image Ia displayed on the display area 115, and as illustrated in FIG. 12A, places the printing apparatus 3 in a position at which the x-coordinate and the y-coordinate of the position represented by the fourth image Id in the first image Ia respectively match the x-coordinate Xa and the y-coordinate Ya of the position A in the printing medium M.

As described above, the x-coordinate and the y-coordinate of the center Ce of the first image Ia respectively match the x-coordinate and the y-coordinate of the center Cb of the print area 102a. Therefore, the x-coordinate and the y-coordinate of the print area 102a also respectively match the x-coordinate Xa and the y-coordinate Ya of the position A in the printing medium M.

As a result, the position A in the printing medium M is set as the start position of printing.

In this state, when the user instructs start of printing and moves the printing apparatus 3 in the printing direction illustrated in FIG. 12B, as illustrated in FIG. 12B, the text "ABC" being the image to be printed is printed with the position A in the printing medium M serving as the start position of printing.

The text "ABC" is printed at the printing position in the y-axis direction represented by the second image Ib to the fourth image Id, to have the printing width Ld represented by the second image Ib to the fourth image Id.

That is, the user can intuitively set the position A in the printing medium M to be the start position of printing, by performing an easy operation to place the printing apparatus 3 so that the x-coordinate and the y-coordinate of the position represented by the fourth image Id in the first image Ia respectively match the x-coordinate Xa and the y-coordinate Ya of the position A in the printing medium M.

The user can properly set the printing position in the y-axis direction, by moving the printing apparatus 3 while grasping the printing width Ld and the printing position of the image to be printed in the y-axis direction by viewing the second image Ib to the fourth image Id.

It should be noted that, in Embodiment 3, the size of the first image Ia is described to be equal or substantially equal to the size of the print area 102a. However, this is merely an example, and the size of the first image Ia may be different from the size of the print area 102a, as long as a user recognizes these sizes to be substantially equal to each other. Specifically, in Embodiment 3, the length Le of the first image Ia in the y-axis direction is described to be equal or substantially equal to the length Lb of the print area 102a in the y-axis direction. However, the length Le of the first image Ia in the y-axis direction may be different from the length Lb of the print area 102a in the y-axis direction, as long as the user recognizes these lengths to be substantially equal to each other. That is, the first image Ia may have any size as long as it is substantially equal to the size of the print area 102a and the user recognizes these sizes to be substantially equal to each other.

Furthermore, the size of the first image Ia may be larger or smaller than the size of the print area 102a, beyond an extent in which the user recognizes it to be substantially equal to the size of the print area 102a. Even in such a case, because the first image Ia is provided directly above the print area 102a, the user can still intuitively set the position A in the printing medium M as the start position of printing, by performing an easy operation to place the printing apparatus 3 to cause the x-coordinate and the y-coordinate of the center Cc of the first image Ia to respectively match the x-coordinate Xa and the y-coordinate Ya of the desired position A in the printing medium M.

It should be noted that, in Embodiment 3, the first image Ia and the print area 102a are described to overlap with each other in such a manner that the first image Ia includes the print area 102a therein, when viewed in the direction along the reference line V. However, this is merely an example, and the first image Ia and the print area 102a may, depending on whether the shapes and the arrangements thereof are the same or different, overlap with each other in such a manner that the print area 102a includes the first image Ia therein, when viewed in the direction along the reference line V.

It should be noted that, in Embodiment 3, the input device such as a touch panel may be placed to overlap the display area 115, and via this input device, for example, pressing of an area in the display area 115 in which the first image Ia is displayed by a user may be received as an instruction operation by the user to start printing.

According to this embodiment, when a user presses the area in the display area 115 in which the first image Ia is displayed to instruct start of printing, the plurality of ink nozzles arranged on the print area 102a provided directly below the first image Ia is pushed down towards the printing medium M.

This suppresses degrading of the printing quality due to the plurality of ink nozzles arranged on the print area 102a floating from the printing medium M when printing.

It should be noted that, in Embodiment 3, the display area 115 is described to display both of the first image Ia representing the position of the print area 102a and the second image Ib to the fourth image Id representing the printing width Ld and the printing position of the image to be printed in the y-axis direction. However, this is merely an example, and the display area 115 may display at least the image representing the position of the print area 102a.

It should be noted that, in Embodiment 3, the display area 115 is described to display the second image Ib to the fourth image Id as the image representing the printing width Ld and the printing position of the image to be printed in the y-axis direction. However, this is merely an example, and the display area 115 may display only one of the second image Ib, the third image Ic, and the fourth image Id, as the image representing the printing width Ld and the printing position of the image to be printed in the y-axis direction.

It should be noted that display means that displays the second image Ib to the fourth image Id may be provided in the printing apparatus 1 in Embodiment 1.

So far, the embodiments of the present disclosure are described.

However, the above-described embodiments are an example, and the application scope of the present disclosure is not limited to this. That is, the embodiments of the present disclosure can be applied in various ways, and various embodiments are included in the scope of the present disclosure.

In Embodiment 1, the printing start button 103 is described to be provided directly above the print area 102a, as a guiding mechanism.

In Embodiment 2, the printing start button 114 including the light emitting apparatus 113 is described to be provided directly above the print area 102a, as the guiding mechanism.

In Embodiment 3, the display area 115 is described to be provided as the guiding mechanism.

However, these are merely an example, and any component can be provided directly above the print area 102a, as the guiding mechanism.

For example, a component which is different from the above-described printing start button 103, such as a push button pressed inside when pressed down by a user, a mark, a protrusion, or an indicator, may be provided directly above the print area 102a, as a guiding mechanism.

In Embodiments 1 to 3, the image to be printed is described to be printed on the printing medium M, in an ink-jet method in which the ink in fine droplet is discharged on the printing medium M. However, this is merely an example, and the printing apparatuses 1 to 3 may print the image to be printed in any method. For example, the printing apparatuses 1 to 3 may include a thermal head that is thermally driven, instead of the plurality of ink nozzles of the print area 102a, and print the image to be printed, by thermal transfer printing using this thermal head.

In Embodiments 1 to 3, the print data is described to be acquired by either the wireless communicator 109 or the wired communicator 110 from an external apparatus. However, this is merely an example, and the printing apparatuses 1 to 3 may acquire the print data in any method.

For example, the printing apparatus 1 may acquire the print data by receiving an input of printing content by a user by means of the UI unit 111.

In Embodiments 1 to 3, the moving amount detector 101 is described to detect the moving amount of the printing apparatuses 1 to 3 using the laser optical sensor. However, this is merely an example, and the moving amount detector 101 can detect the moving amount in any method.

For example, the moving amount detector 101 may comprise an LED optical sensor, and irradiate the surface of the printing medium M with light from an LED light source, and capture an image of the shadow resulting from the concave and convex portions on the surface of the printing medium M by an image sensor, and detect the moving amount of the printing apparatuses 1 to 3 by analyzing the image.

In Embodiments 1 to 3, the lower surface 100b is described to be in contact with the printing medium M to face the printing medium M, during printing. However, this is merely an example.

The printing apparatuses 1 to 3 may comprises a supporting means such as a wheel or a leg and move on the printing medium M while being supported by the supporting means so that the lower surface 100b is separated from the printing medium M and faces the printing medium M. In this case, the printing apparatuses 1 to 3 are configured to move on the printing medium M without contacting the printing medium M.

It is needless to say that a printing apparatus that incorporates therein a configuration to realize the function according to the present disclosure can be provided. However, it is also possible to make an existing information processing apparatus or the like function as the printing apparatus according to the present disclosure, by applying thereto a program.

That is, by applying a program for realizing each functional component of a printing apparatus according to the present disclosure so that the CPU or the like that controls the existing information processing apparatus or the like can execute that program, the existing information processing apparatus or the like can function as the printing apparatus according to the present disclosure.

Note that any method can be used to apply such a program. For example, the program can be applied by being stored in a computer-readable storage medium such as a flexible disk, a compact disc (CD)-ROM, a digital versatile disc (DVD)-ROM, or a memory card.

It is also possible to superpose the program on a carrier wave and apply the program via a communication medium such as the Internet.

For example, the program may be posted, for distribution, on a bulletin board (BBS: Bulletin Board System) on a communication network.

Then, it may be configured to execute the above-described processing by activating and executing the program under the control of the operating system (OS) just as the other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A printing apparatus comprising:
    a printer that includes a printing mechanism that performs printing on a printing medium, the printing mechanism being provided in a print area;
    a housing that includes an opening region for exposing the printing mechanism to outside; and
    a guiding mechanism that represents a position of the print area,
    wherein:
    the guiding mechanism is provided at a position directly above the print area and is visible from outside,
    the housing includes a first surface in which the opening region is provided,
    the guiding mechanism includes a guiding member that represents a size of the print area,
    a center position of the guiding member, with respect to a surface that is parallel to the first surface, is provided at a position directly above a center position of the print area with respect to a surface that is parallel to the first surface, and
    a recess is formed in an area that includes the center position of the guiding member.

2. The printing apparatus according to claim 1, wherein the guiding mechanism is provided in a position along a direction that is orthogonal to the first surface and passes through the print area.

3. The printing apparatus according to claim 1, wherein:
    the housing includes a second surface that faces the first surface, and
    the guiding mechanism is provided on the second surface.

4. The printing apparatus according to claim 1, wherein:
    the printer includes a plurality of ink nozzles that discharges ink using an ink-jet method as the printing mechanism, and
    the print area is an area at which the plurality of ink nozzles as the printing mechanism is arranged.

5. The printing apparatus according to claim 1, wherein a mark representing the center position of the guiding member is formed on the guiding member.

6. The printing apparatus according to claim 1, wherein:
    the print area extends in a first direction,
    the printer is configured to print on the printing medium while moving relative to the printing medium, in a direction intersecting the first direction, and
    the guiding member is provided along the first direction, and a length of the guiding member along the first direction is substantially equal to a length of the print area along the first direction.

7. The printing apparatus according to claim 1, wherein the guiding member comprises any of a push-button, a mark, a protrusion protruding from a surface of the housing, and an indicator.

8. The printing apparatus according to claim 1, wherein the guiding member comprises a switch to instruct a start of printing by the printer.

9. The printing apparatus according to claim 1, wherein:
    the print area extends in a first direction,
    the printer is configured to print on the printing medium while moving relative to the printing medium, in a direction intersecting the first direction,
    the guiding mechanism comprises a light emitting apparatus that includes a plurality of light sources linearly arranged along the first direction, and light emission by each of the plurality of light sources of the light emitting apparatus is controlled to represent a size of an image to be printed on the printing medium by the printer along the first direction, and a position at which the image is to be printed along the first direction.

10. The printing apparatus according to claim 9, wherein the plurality of light sources of the light emitting apparatus is provided integrally with the guiding member.

11. A printing apparatus comprising:
    a printer that includes a printing mechanism that performs printing on a printing medium, the printing mechanism being provided in a print area;
    a housing that includes an opening region for exposing the printing mechanism to outside; and
    a guiding mechanism that represents a position of the print area,
    wherein:

the guiding mechanism is provided at a position directly above the print area and is visible from outside, the print area extends in a first direction, the printer is configured to print on the printing medium while moving relative to the printing medium, in a direction intersecting the first direction, the guiding mechanism comprises a light emitting apparatus that includes a plurality of light sources linearly arranged along the first direction, light emission by each of the plurality of light sources of the light emitting apparatus is controlled to represent a size of an image to be printed on the printing medium by the printer along the first direction, and a position at which the image is to be printed along the first direction, the guiding mechanism includes a guiding member that represents a size of the print area, and the plurality of light sources of the light emitting apparatus is provided at a position separated from the guiding member.

12. A printing apparatus comprising:

a printer that includes a printing mechanism that performs printing on a printing medium, the printing mechanism being provided in a print area;

a housing that includes an opening region for exposing the printing mechanism to outside; and a display apparatus in which a display area is provided in an area including a position directly above the print area, wherein:

the housing includes a first surface in which the opening region is provided, the display apparatus displays a first guiding image that represents a position in which the print area is provided, at a position of the display area that is directly above the print area, the first guiding image serves as a guiding mechanism that represents a position of the print area, the display apparatus displays the first guiding image, in the display area, at a position such that a center position of the first guiding image, with respect to a surface that is parallel to the first surface, is directly above a center position of the print area with respect to a surface that is parallel to the first surface, and the first guiding image includes an image that represents the center position of the first guiding image.

13. The printing apparatus according to claim 12, wherein:

the print area extends in a first direction, the printer is configured to print on the printing medium while moving relative to the printing medium, in a direction intersecting the first direction, and the first guiding image is displayed in a direction along the first direction, and a length of the first guiding image along the first direction is substantially equal to a length of the print area along the first direction.

14. The printing apparatus according to claim 12, wherein:

the print area extends in a first direction, and the display apparatus further displays a second guiding image that represents a size of an image to be printed on the printing medium by the printer along the first direction of the print area, and a position at which the image is to be printed along the first direction.

15. A printing apparatus comprising:

a printer that includes a printing mechanism that performs printing on a printing medium, the printing mechanism being provided in a print area;

a housing that includes an opening region for exposing the printing mechanism to outside; and a display apparatus in which a display area is provided in an area including a position directly above the print area, wherein:

the display apparatus displays a first guiding image that represents a position in which the print area is provided, at a position of the display area that is directly above the print area, the first guiding image serves as a guiding mechanism that represents a position of the print area, the print area extends in a first direction, the display apparatus further displays a second guiding image that represents a size of an image to be printed on the printing medium by the printer along the first direction of the print area, and a position at which the image is to be printed along the first direction, and the second guiding image is displayed to overlap the first guiding image.

16. The printing apparatus according to claim 15, wherein the second guiding image is displayed in a size substantially equal to a size of the image on the printing medium when the image is printed on the printing medium, and at a position substantially equal to a position of the image on the printing medium when the image is printed on the printing medium.

* * * * *